(12) United States Patent
Lebizay et al.

(10) Patent No.: US 7,436,846 B2
(45) Date of Patent: Oct. 14, 2008

(54) NETWORK DEVICE ARCHITECTURE AND ASSOCIATED METHODS

(75) Inventors: Gerald Lebizay, Madison, NJ (US); David W. Gish, Riverdale, NJ (US); Brian E. Peebles, Cranford, NJ (US)

(73) Assignee: Intel Corporation, Santa Clara, CA (US)

( * ) Notice: Subject to any disclaimer, the term of this patent is extended or adjusted under 35 U.S.C. 154(b) by 1079 days.

(21) Appl. No.: 10/285,360

(22) Filed: Oct. 30, 2002

(65) Prior Publication Data

US 2004/0085985 A1    May 6, 2004

(51) Int. Cl.
    *H04L 12/28* (2006.01)
(52) U.S. Cl. .................. 370/419; 370/463; 709/217
(58) Field of Classification Search ............. 370/419, 370/463, 401, 392, 352, 389, 357, 356, 353, 370/434, 442; 709/217, 225
    See application file for complete search history.

(56) References Cited

U.S. PATENT DOCUMENTS 6,954,463 B1 * 10/2005 Ma et al. .............. 370/401
7,142,509 B1 * 11/2006 Rovner et al. .......... 370/230

\* cited by examiner

*Primary Examiner*—Chi H. Pham
*Assistant Examiner*—Alexander Boakye
(74) *Attorney, Agent, or Firm*—Blakely, Sokoloff, Taylor & Zafman LLP

(57) ABSTRACT

A network device architecture comprising a fault-tolerant array of network processing modules, selectively coupled to trunk interface boards through main fabric switch(es) using high-bandwidth communication media and selectively coupled to any of a number of media processing modules using low-bandwidth communication media. Network content delivered to the network processing modules for network processing that contain media content are selectively coupled to any of the one or more media processing modules for additional media processing before passing the processed content to the next hop in the path towards the destination computing appliance.

16 Claims, 3 Drawing Sheets

NETWORK DEVICE ARCHITECTURE AND ASSOCIATED METHODS

TECHNICAL FIELD

Embodiments of the invention generally relate to data network(s) and, more particularly to a network device architecture and associated methods.

BACKGROUND

The term network device generally refers to a class of electronic appliances (e.g., hubs, switches, routers, etc.) that facilitate the communication of data (e.g., in packet form) within and between networks from a source computing appliance to a target computing appliance. One type of network device is a router.

Simplistically, a router is comprised of a number of interface ports, coupled with one or more network processor(s) through a high-bandwidth router switching fabric. Packets received at an interface port are switched to an available network processor, which analyzes the packet header to identify the target computing appliance and select a next hop (i.e., next node) in the network infrastructure to the target computing appliance.

Network devices (e.g., routers) are typically implemented using an extensible rack-mounted chassis. The chassis is comprised of a number of slots, to receive one or more network processor boards, switching boards, telco I/O boards, etc. The boards are communicatively coupled to one another through a backplane to which each of the boards is coupled.

One of the limitations commonly associated with such network devices is that they are application specific. A router, for example, typically only performs routing tasks, i.e., analyzing a packet header for destination information, analyzing a router table to correlate the identified destination with a next hop, and forwarding the packet to the identified next hop towards the target destination. Network devices are not designed for, and typically do not perform additional processing tasks extraneous to the task of moving packets from source to destination.

With the advent of streaming media, the amount of media content that is now traversing otherwise traditional data networks continues to grow, although still a small subset of the overall traffic traversing the network. Once the province of high-end desktop computers, media content is now accessed by any number of clients including handheld devices (e.g., personal digital assistant (PDA), palmtop computers, wireless telephones, etc.), laptop computers, and the like. Such a broad range of computing appliances has an associated range of computing power that can be brought to bear on processing media content, some of which are up to the task, while others need processing assistance to meet the expectations of the user.

Consequently, there is a need to support the delivery of such media content to/from a heterogeneous client-base, while expanding the scope of services for traditional data networks and network devices.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
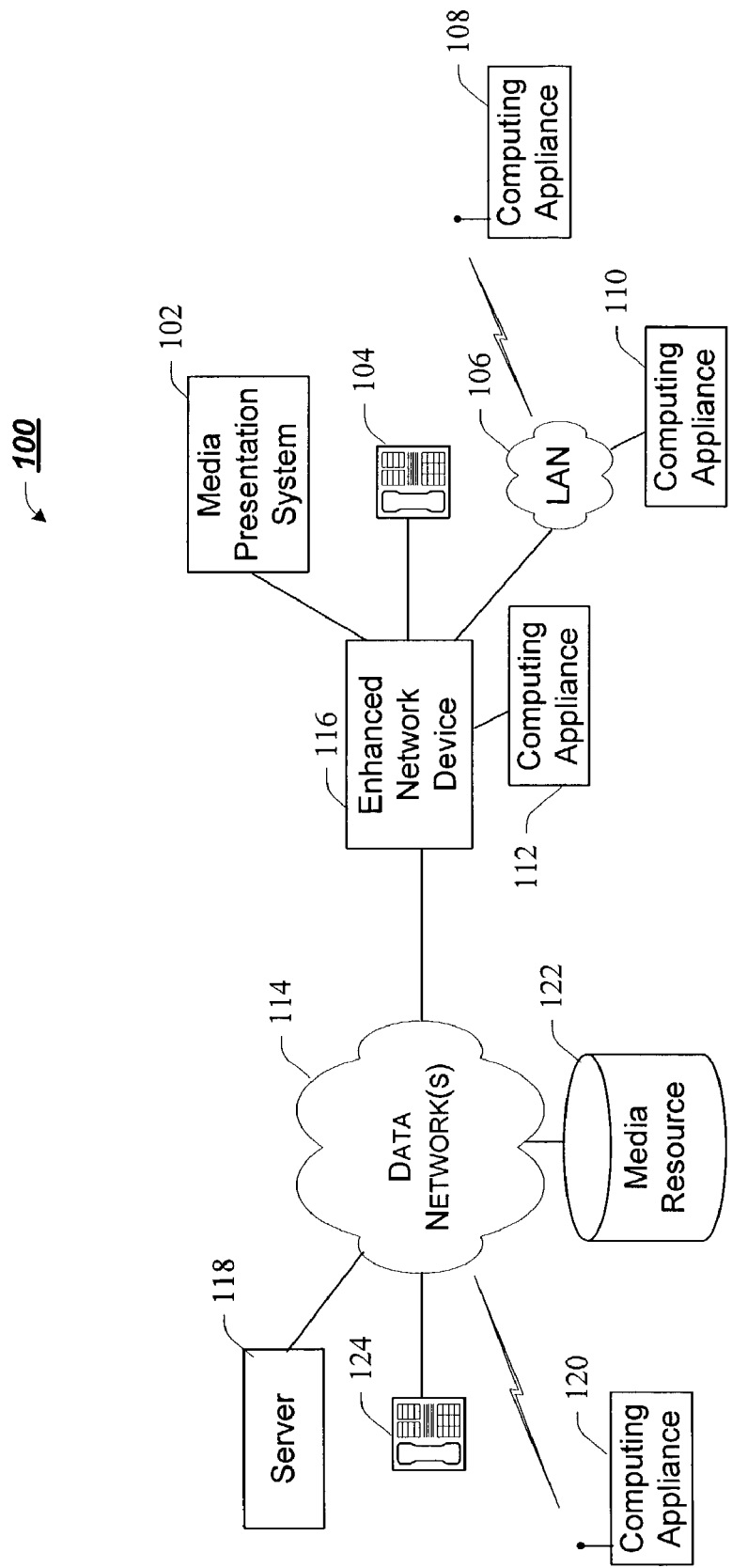
FIG. 1 is a block diagram of an example data network incorporating an embodiment of the invention.

Embodiments of the invention are generally directed to a method and associated architecture for expanding router fabrics to perform media processing. More particularly, a network device architecture is introduced comprising a fault-tolerant array of network processing modules, selectively coupled to trunk interface boards through main fabric switch(es) using high-bandwidth communication media. In addition to performing traditional network processing functions (e.g., switching, routing, etc.), network processing modules are selectively coupled to any of a number of media processing modules using low-bandwidth communication media. Network content (e.g., packets or datagrams) delivered to the network processing modules for network processing that contain media content may well be selectively coupled to any of the one or more media processing modules for additional media processing, before passing the processed content to the next hop in the path towards the destination computing appliance.

In this regard, an enhanced network device is presented including an extensible, fault-tolerant router fabric comprising network processing modules and media processing modules. According to one example embodiment, discussed more fully below, the fault tolerance of the enhanced network device is achieved using an N+1 redundant architecture of network processing modules, wherein at least one extra network processing module is populated within the chassis to assume the network processing responsibility for any other network processing module that becomes non-functional, or to which communication is interrupted. The redundant network processing module is communicatively coupled to at least a subset of the media processing modules to support redundant media processing capability as well as network processing capability.

Those skilled in the art will appreciate that the architecture disclosed herein selectively provides media processing capabilities for at least a subset of packets passing through a host router. Examples of such media processing may well include one or more of echo cancellation, audio/video (en/de)coding, audio/video effects processing, etc. relieving the source and/or destination client of such processing tasks and improving their ability to render such content (audio/video) without undue interruptions, pauses or artifacts resulting from otherwise limited processing capability of the client.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

FIG. 1 illustrates a block diagram of an example network within which the teachings of the invention may well be practiced. As shown, network 100 is depicted comprising a heterogeneous collection of computing appliances (e.g., clients) 102-112 coupled to the resources of data network 114 through an enhanced network device (END) 116, incorporating the extensible fault-tolerant, media processing router fabric architecture of the present invention. In this regard, enhanced network device 116 is depicted as an edge device supporting access to network 114 for one or more of a media presentation system 102, a telephony appliance 104, a local area network (LAN) 106 supporting wireless client(s) 108 and wired client(s) 110 as well as computing appliance 116. Data network 114 is depicted coupled with one or more of computing appliance(s) (e.g., server 118), wireless computing appliance(s) 120, media resource(s) 122, and telephony device(s) 124, as shown. It should be appreciated, however, that inventive features of network device 116 are not limited to implementation as an edge device and, as such, network device 116 may well be implemented anywhere within network 114, LAN 106, or any other packet-switched network.

As introduced above, enhanced network device 116 includes a fault-tolerant router fabric comprising main fabric switch(es) selectively coupling any of a number of trunk interface boards to one or more network processing modules implemented as fabric expansion boards, which in turn are selectively coupled to one or more media processing modules. According to one aspect of the present invention, network device 116 includes at least one redundant network processing module, switchably coupled to any one or more of the trunk interface ports through the main fabric switch(es), wherein the main fabric switch(es) selectively substitute the redundant network processing module upon detecting a processing and/or communication failure associated with one or more of the primary network processing modules.

According to one aspect of the invention, a switched serial communication architecture is used to communicatively couple the elements of the enhanced network device 200. According to one example implementation, discussed more fully below, enhanced network device 200 employs an InfiniBand™ architecture, using high-bandwidth communication media to couple the trunk interface boards and the network processing modules to the main fabric switches, while using lower-bandwidth communication media to couple the media processing modules to the network processing modules. Variations on this allocation of bandwidth are anticipated within the scope and spirit of the present invention.

In addition to the network processing capability of the network processing modules, enhanced network device 116 includes one or more media processing modules associated and redundantly coupled with each of the network processing modules using lower bandwidth communication media. As developed more fully below, the media processing modules are populated with one or more media processor(s), which can perform some or all of the (en/de)coding associated with identified media packets received at the network device 116, before forwarding such packets to the next step in the path towards a destination computing appliance.

For purposes of clarity, and not limitation, only a single network device (i.e., enhanced network device 116) is depicted within network 100. Nonetheless, it should be appreciated that data network 114, LAN 106, or other coupled network(s) may well include any number of legacy and/or enhanced network devices. In this regard, as will be developed more fully below, END 116 is fully compatible with legacy network device(s), e.g., routers, switches, hubs, etc.

As used herein, but for the inclusion of, and interoperation with enhanced network device 116, elements 102-114 and 118-124 are each intended to represent such device(s) or network(s) as they are commonly known in the art. That is, enhanced network device 116 is compatible with any of a number of computing appliance(s) that use, or may be configured or adapted to use a conventional packet switched network. Indeed, the inclusion of enhanced network device 116 may well enable one or more classes of computing appliance(s) to access and utilize media content via a packet switched network that might not have had the processing power to support such applications previously. In this regard, the enhanced network device architecture and associated methods disclosed herein is an enabling technology, facilitating the delivery of multimedia content to/from computing appliances that might not otherwise have the processing horsepower to deliver such content in a manner that would be acceptable to a user of the client computing appliance.

Example Network Device Architecture

Figure 2:
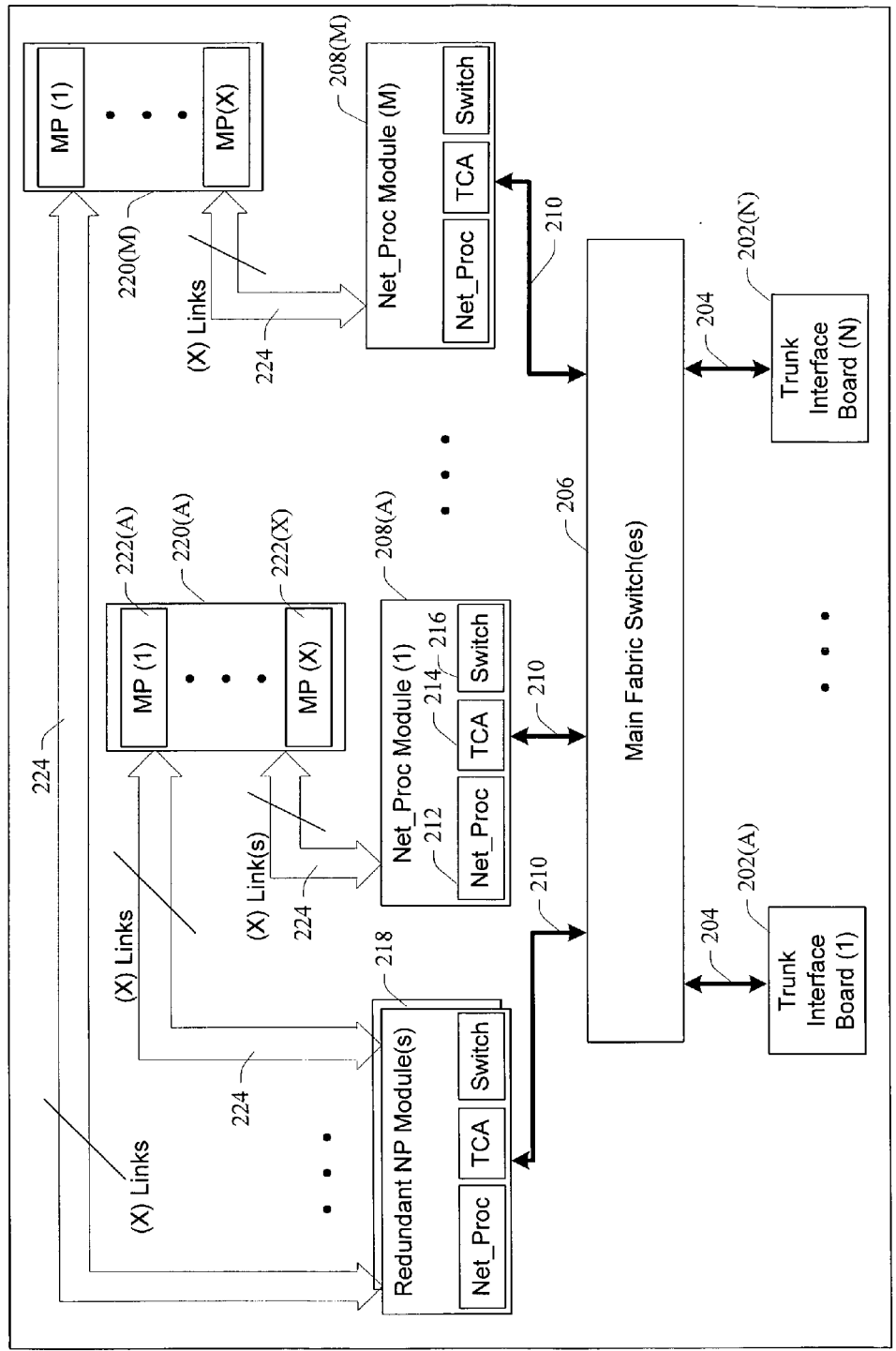
FIG. 2 is a block diagram of an example network device architecture incorporating an embodiment of the invention.

FIG. 2 illustrates a block diagram of an example enhanced network device architecture 200, according to one example embodiment of the invention. According to one example implementation, enhanced network device 200 may well be implemented within network 100 as, e.g., network device 116. In accordance with the illustrated example embodiment of FIG. 2, enhanced network device 200 is depicted comprising one or more trunk interface board(s) 202A ... N, main fabric switch(es) 206, one or more network processing modules 208A ... M, one or more redundant network processing module(s) 218, and one or more media processing modules 220A. ... .X, each coupled as depicted. According to one example embodiment, the elements of enhanced network device 200 are coupled through a switched serial fabric such as, e.g., an InfiniBand™ communication network. Further detail regarding the switched serial InfiniBand™ communication architecture is provided with reference to the InfiniBand™ Architecture Spectfication, volume 1, release 1.0.a, from the InfiniBand$^{SM}$ Trade Association (Jun.19, 2001), the content of which is incorporated herein by reference.

According to one example implementation, the trunk interface board(s) 202A ... N and the network processor module(s) 208A ... M, 218 are coupled to the main fabric (InfiniBand™) switch(es) 206 with high-bandwidth (e.g., 4× or 12×) InfiniBand™ communication links 204 and 210, respectively. In contrast, the network processing module(s) 208A ... M, 218 are coupled with the media processing module(s) 220A ... M using a number (X) of lower-bandwidth (e.g., 1×) InfiniBand™ communication links 224. That is, given the limited amount of media traffic (as a percentage of total traffic carried by the network device 200), a number (X) of lower-bandwidth InfiniBand™ links may well be used, enabling the InfiniBand™ fabric to allocate higher bandwidth in support of processing the bulk of the traffic to/from the network processing module(s) 208A ... M. As used herein, the communication fabric (e.g., InfiniBand™) coupling the elements of enhanced network device 200 uniquely identifies each of the elements within the network device (e.g., using an address, unique identifier, etc.).

Network processing module(s) (or, fabric expansion board(s)) 208A ... M are depicted comprising one or more network processor(s) 212, an associated one or more channel adapter(s) 214 and a switch 216. In accordance with the illustrated example implementation using the switched serial InfiniBand™ fabric, communication from the main fabric switch(es) 206 is received at switch 216 and passed to network processor 212 via an InfiniBand™ channel adapter 214. As shown, channel adapter 214 is a target channel adapter (TCA), but it is envisioned that alternate channel adapters may well be substituted therewith without deviating from the spirit and scope of the present invention.

As used herein, network processor(s) 212 of the network processing modules 208A . . . M, 218 perform one or more conventional network processing functions of switching and/or routing, as well as supporting value added services such as, e.g., quality of service prioritization, support of virtual channels, tunneling, and the like. In addition, according to one aspect of the invention, network processors 212 analyze at least a subset of the content (e.g., a header, or payload) of a received packet to determine whether the packet includes media content. If media content is identified, and further processing is warranted, network processor 212 routes the content to one or more media processor(s) 222A . . . X of an associated media processing module 220A . . . M for such media processing. In accordance with another embodiment, the entire packet may be sent to the media processor(s) 222. Any number of techniques may be used to identify whether a received packet contains media content, any of which would be suitable for implementation by network processor 212.

Media processing modules 220A . . . M are depicted comprising one or more media processing engines (MP) 222A . . . X for performing media processing operations. The media processing engines may well be implemented in hardware, (e.g., using a digital signal processor (DSP), field programmable gate array (FPGA), an application specific integrated circuit (ASIC), and the like), or a combination of hardware and software (e.g., using a microprocessor, microcontroller, a special purpose processor, and the like). As introduced above, media processing modules 220A . . . M can support any one or more of a number of different media processing operations, depending in part on the implementation into which END 200 is introduced. Examples of such media processing operations include, but are not limited to, echo cancellation, en/decoding of media content, media effects processing, and the like.

Once a media processing engine 222 has completed its processing task(s), media processing module 220 sends the processed packet back to a network processing module 208 for routing through the main fabric switch(es) 206 and the trunk interface board(s) 202 to the network infrastructure towards the target computing appliance denoted in the packet. According to one example implementation, the packet is routed back through the network processing module 208 that delivered the packet to the media processing module 220, although the invention is not limited in this regard.

In accordance with one aspect of the present invention, a fault-tolerant implementation of network processing module(s) 208 is implemented using one or more redundant network processing modules 218. According to one example embodiment, an N+1 redundancy is employed wherein an extra network processing module 218 is populated within network device 200, and is reserved for substitution with another network processing module 208A . . . M that is no longer functional, or to which communication has ceased. In accordance with the illustrated example implementation of FIG. 2, the redundant network processing module 218 is selectively switched into service by the main fabric switch(es) 206 upon detecting a fault associated with a network processing module 208A . . . M. If the fault lies within the network processing module 208, the IBA switch 216 reports the fault to the main fabric switch(es) 206, which dynamically replaces the defective network processing module 208 in a switching table with the identifier of a redundant network processing module 218. Alternatively, the main fabric switch (es) 206 may detect a fault in the communication path 210 between the switch 206 and a network processing module 208, and dynamically replace the defective element 208 with the redundant network processing module 218 in a switching table. According to one example implementation, main fabric switch(es) 206 maintain a list of active network processing modules 208A . . . M, when a processing module 208 or associated communication path 210 becomes inoperative, main fabric switch(es) 206 update the list to remove the identified network processing module 208 with a redundant network processing module 218.

In accordance with the illustrated example implementation, the redundant network processing module 218 is architecturally and functionally equivalent to that of the other network processing modules 208A . . . M, but is not limited in this regard. That is, redundant network processing modules of greater or lesser complexity, which nonetheless perform the network processing functions disclosed herein are anticipated within the scope and spirit of the present invention.

Operational Example(s)

Figure 3:
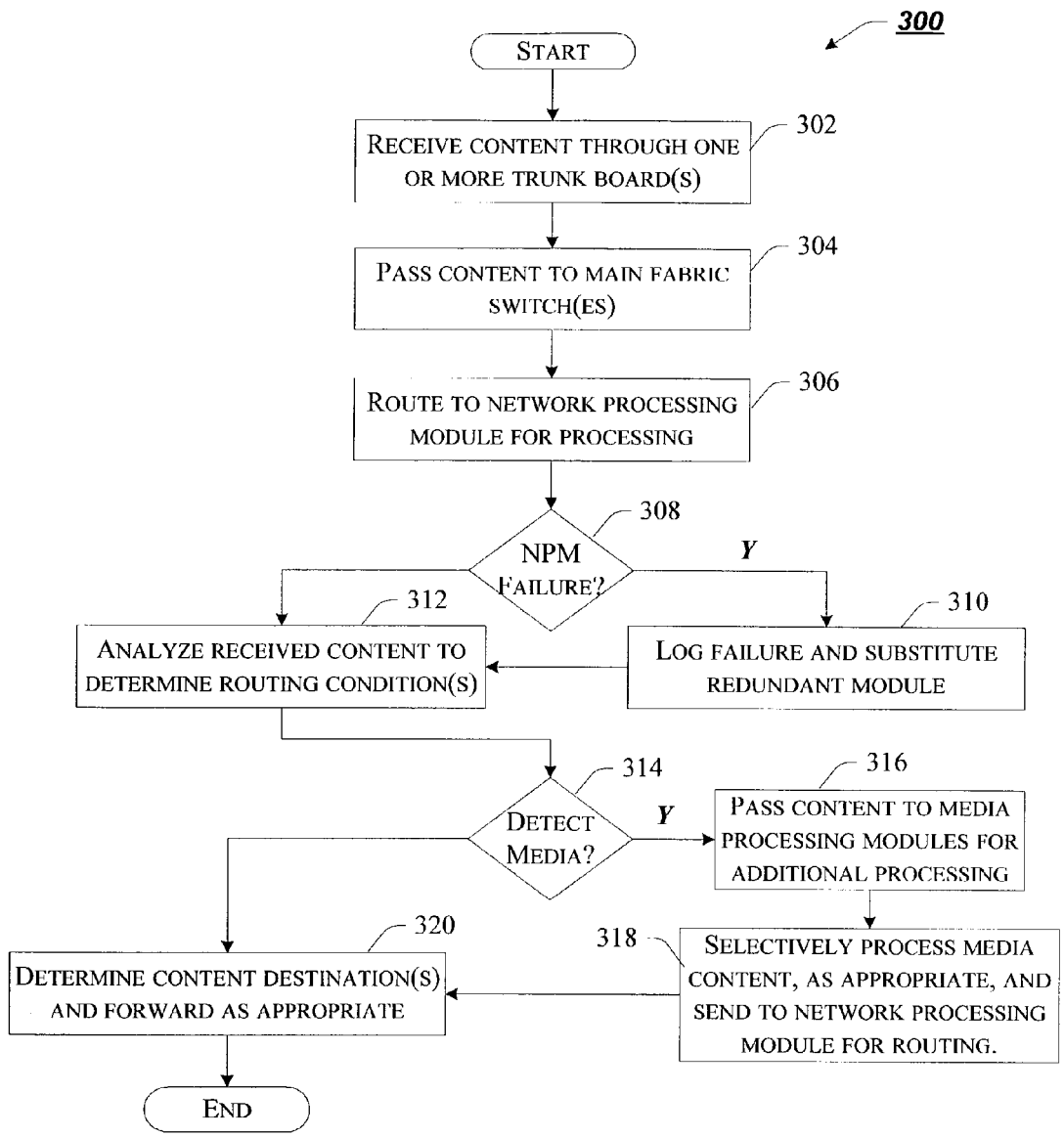
FIG. 3 is a flow chart of an example method of routing packets in accordance with an embodiment of the invention.

Having introduced the operating environment and architectural elements of the enhanced network device 200, above, attention is now directed to FIG. 3 where an operational example implementation of the enhanced network device 200 is presented in greater detail. For ease of illustration, and not limitation, the method of FIG. 3 is developed with continued reference to FIGS. 1 and 2, as appropriate. Nonetheless, it is to be appreciated that the teachings of FIG. 3 may well be implemented in alternate network architectures/configurations without deviating from the spirit and scope of the present invention.

FIG. 3 is a flow chart of an example method of enhanced network device operation, in accordance with one aspect of the present invention. In accordance with the illustrated example implementation of FIG. 3, the method 300 begins with block 302 where enhanced network device 200 receives content through one or more trunk interface board(s) 202A . . . N. The received content is passed to one or more main fabric switches 206, block 304, through a high-bandwidth communication media such as, e.g., an InfiniBand™ 4× or 12× communication link 204.

In block 306, a main fabric switch 206 routes the received packet to a network processing module 208A . . . M for processing. According to one example implementation, main fabric switch(es) 206 apply load balancing features to spread the load of received packets across the plurality of network processing module(s) 208A . . . M populating a host chassis 200. As introduced above, the main fabric switch(es) 206 are coupled with an InfiniBand™ switch 216 in the network processing module 208 using a high-bandwidth (e.g., 4× or 12×) InfiniBand™ communication link 210.

In making the selection of network processing module 208A . . . M, main fabric switch(es) 206 determines whether any of the network processing module(s) 208A . . . M are experiencing faults (e.g., as reported by switch 216), or whether a communication path 210 is experiencing a fault, block 308. If so, the main fabric switch(es) 206 may well log the failure, before substituting a redundant network processing module 218 and/or communication link 210 for the faulty element, before passing the packet to the appropriate network processing module.

In block 312, the network processing module 208 (or, 218) receives the packet at the switch 216, which routes the packet to the network processor 212 via the channel interface 214. As introduced above, network processor 212 analyzes at least a subset of the received packet (e.g., the header) to make a determination of routing conditions associated with the received packet (e.g., packet source, packet destination, quality of service (QoS) parameters, etc.). In addition, in accordance with one aspect of the invention, network processor 212 analyzes at least a subset of the received packet to determine whether the packet includes audio and/or video content, block 314.

If, in block 314, network processor 212 identifies media content in the received packet, network processor 212 directs the received packet to an associated media processing module 220A . . . M for media processing, block 316. That is, network processor 212 routes the packet back through the channel adapter 214 and the switch 216 to one or more of a lower-bandwidth (e.g., 1×) InfiniBand™ communication link of the plurality of links 224 coupled with a media processing engine 222 of an associated media processing module 220.

In block 318, the media processing engine 222 selectively processes the media content, as appropriate, before sending the processed packet to a network processing module 208 (or, 218) for routing towards the target destination. As introduced above, the media processing engine 222 may well perform any of a number of processing tasks such as, e.g., one or more of media (en/de)coding, echo cancellation, media effects processing, and the like. The type of media processing performed depends, at least in part, on the state of the content received, its source, and/or its destination. If, for example, the media content is received directly from a coupled communication client, or from a client with minimal encoding having been performed, media processing engine 222 detects this, and selectively performs additional processing before transmission through the network architecture towards its target destination. Conversely, if a packet is received from the network architecture and is nearing its target destination, media processing engine 222 may well selectively invoke one or more media decoding processes to relieve certain decoding tasks from the target client.

If network processor 212 determines (block 314) that the received packet does not include media content, or once the media processing (block 318) is completed, network processor 212 identifies routing information associated with a next node (e.g., network device) in the path towards the target destination of the computing appliance, and forwards the packet to the identified node, block 320. More specifically, network processor 212 correlates information identified within the received packet against information contained in a routing table (not particularly denoted) to identify the next point (sometimes referred to as a hop) in the network architecture towards the target destination, modifies physical layer header information associated with the packet, and sends the packet into the network 100 through, e.g., channel adapter 214, switch 216, main fabric switch(es) 206 and a trunk interface board 202.

Alternate Embodiment(s)

Figure 4:
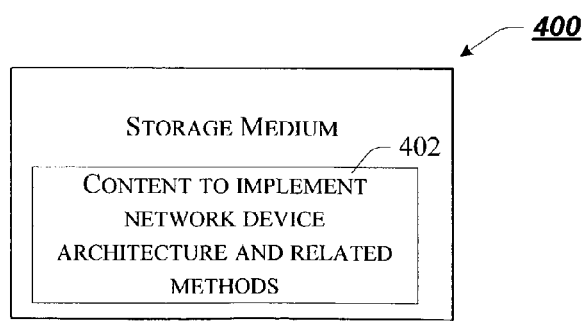
FIG. 4 is a block diagram of a storage medium including content which, when executed by an accessing machine, causes the machine to implement one or more aspects of an embodiment of the invention.

FIG. 4 is a block diagram of an example storage medium comprising a plurality of executable instructions which, when executed, cause an accessing machine to implement one or more aspects of the innovative network device architecture and/or associated methods. In this regard, storage medium 400 includes content 402 for implementing a fault tolerant, extensible network device architecture and associated methods, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. Moreover, although the invention has been described in the context of a network device, those skilled in the art will appreciate that such functionality may well be embodied in any of number of alternate embodiments such as, for example, integrated within a computing device (e.g., a server).

The present invention may be provided as a computer program product, which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer via a communication link (e.g., a modem or network connection).

Many of the methods are described in their most basic form but steps can be added to or deleted from any of the methods and information can be added or subtracted from any of the described messages without departing from the basic scope of the present invention. For example, network processor(s) 212 may well be implemented on one or more of trunk interface board(s) 202A . . . N and/or media processing module(s) 220A . . . M. Alternatively, media processing engines 222A . . . X may well be implemented within the fabric expansion (network processing) modules 208A . . . M. In yet another embodiment, processor elements (not particularly denoted) on the trunk interface boards perform an initial analysis of a received packet to determine whether the packet includes multimedia content and, if so, routes the packet through a network processing module switch 216 directly to a media processing module 220A . . . M, before being routed to a network processor 212 for network-related processing. Any number of variations of the inventive concept are anticipated within the scope and spirit of the present invention.

In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   receiving a packet at a trunk interface board of a network device, the network device including a plurality of network processing modules coupled to a plurality of trunk interface boards through a switched communication fabric;
   identifying an available network processing module from the plurality of network processing modules to process the received packet; and
   routing the received packet to the identified network processing module, which determines whether the received packet includes media content requiring additional media processing, before performing traditional network processing on the received packet.

2. A method according to claim 1, the identifying an available network processing module comprising:
   accessing a list of active network processing modules within a main fabric switch of the network device; and
   selecting a network processing module from the list.

3. A method according to claim 2, further comprising:
   detecting a fault associated with an identified network processing module, or communication link associated therewith; and
   updating the list of active network processing modules to remove the identified network processing module and to add an identifier associated with a redundant network processing module.

4. A method according to claim 1, the method further comprising:
   analyzing at least a subset of the received packet to determine whether the received packet includes media content; and
   routing packets with media content to an associated media processing module for media processing.

5. A method according to claim 4, wherein the media processing includes one or more of echo cancellation, media encoding, media decoding, and media effects processing.

6. A method according to claim 4, further comprising:
   sending the processed media packet back to a network processing module for traditional network processing prior to transmission towards an identified target destination of the media packet via a trunk interface board.

7. A method according to claim 1, wherein performing traditional network processing comprises:
   analyzing a subset of the received packet to identify a target destination;
   identifying another network device in a network communication path towards the target destination based, at least in part, on content within the subset of the received packet.

8. A computer readable medium having stored thereon, computer executable instructions which, when executed by an accessing network device, causes the network device to implement a method including, receiving a packet at a trunk interface board of a network device, the network device including a plurality of network processing modules coupled to a plurality of trunk interface boards through a switched communication fabric; identifying an available network processing module from the plurality of network processing modules to process the received packet; and routing the received packet to the identified network processing modules, which determines whether the received packet includes media content requiring additional media processing, before performing traditional network processing on the received packet.

9. A computer readable medium according to claim 8, wherein the instructions to implement of identifying an available network processing module causes the accessing network device to implement a method comprising: accessing a list of active network processing modules within a main fabric switch network device; and selecting a network processing module from the list.

10. A computer readable medium according to claim 9, further comprising instruction that causes an accessing network device to implement a method comprising: detecting a fault associated with an identified network processing module, or communication link associated therewith; and updating the list of active network processing modules to remove the identified processing module and to add an identifier associated with a redundant network processing module.

11. A computer readable medium according to claim 8, further comprising instruction that causes an accessing network device to implement a method comprising: analyzing at least a subset of the received packet to determine whether the receive packet includes media content; and routing packets with media content to an associated media processing module for processing.

12. A computer readable medium according to claim 11, wherein the instructions to perform media processing includes instruction that causes the accessing network device to implement one or more of echo cancellation, media encoding, media decoding, and media effects processing on the received media packet.

13. A system comprising:
   one or more communication media; and
   a network device, coupled with the one or more communication media, to receive content from remote devices through the one or more communication media, the network device including,
   one or more trunk interface boards, coupled with the communication media;
   a plurality of network processing modules, coupled with the one or more trunk interface boards through a switched communication fabric, to determine whether packet received from the trunk interface board(s) includes media content and, if so, to pass at least the media content to a communicatively coupled media processing module; and
   main fabric switch(es), coupled between the network processing module(s) and the trunk interface board(s), to receive a packet from the one or more trunk interface board(s) and identify an available network processing module to process the received packet.

14. A system according to claim 13, wherein the network device selectively processes media content identified in received packets before forwarding such packets towards an identified destination via said communication media.

15. An apparatus comprising:
   one or more trunk interface boards;
   a plurality of network processing modules, coupled with the one or more trunk interface boards through a switched communication fabric, each of the plurality of network processing modules to determine whether a packet received from the trunk interface board(s) includes media content and, if so, to pass at least the media content of the packet to a media processing module communicatively coupled to each of the plurality of network processing modules;

one or more media processing modules, coupled with the network processing modules, to receive packets containing media content and perform select media processing operation(s) thereon wherein the media processing module(s) are coupled to associated network processing modules through a second switched communication fabric, the second switched communication fabric having a lower bandwidth than the switched communication fabric coupling the trunk interface board(s) and network processor(s).

16. An apparatus according to claim 15, wherein the lower-bandwidth switched communication fabric is comprised of InfiniBand™ 1× communication links.

* * * * *